(No Model.)
C. A. WILLIAMS.
RATCHET DRILL.
No. 547,053.  Patented Oct. 1, 1895.
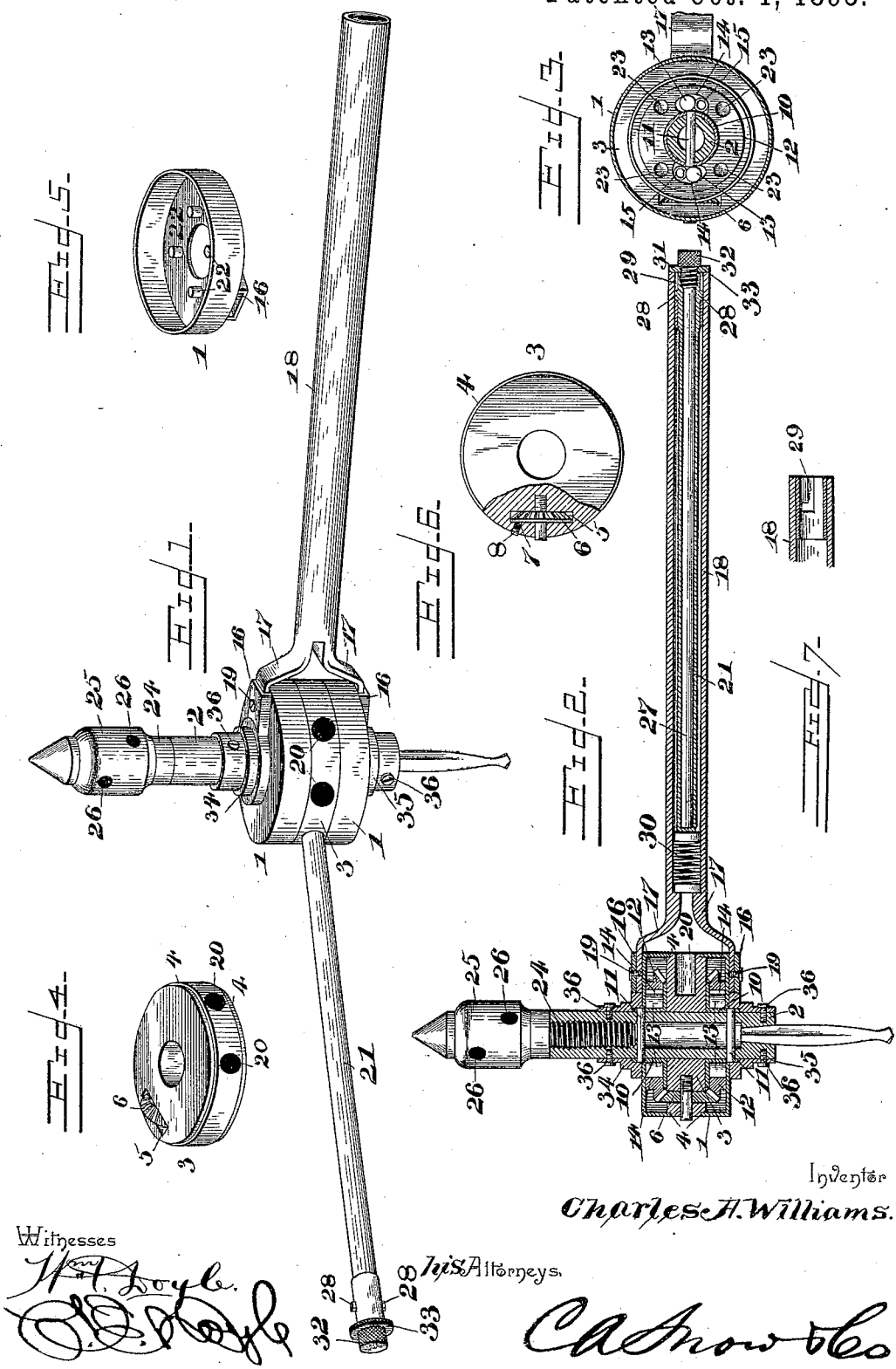
Witnesses
Inventor
Charles A. Williams
his Attorneys
C. A. Snow & Co.

UNITED STATES PATENT OFFICE.

CHARLES ALEXANDER WILLIAMS, OF NEW WHATCOM, WASHINGTON.

RATCHET-DRILL.

SPECIFICATION forming part of Letters Patent No. 547,053, dated October 1, 1895.

Application filed April 4, 1895. Serial No. 544,463. (No model.)

*To all whom it may concern:*

Be it known that I, CHARLES ALEXANDER WILLIAMS, a citizen of the United States, residing at New Whatcom, in the county of Whatcom and State of Washington, have invented a new and useful Ratchet-Drill, of which the following is a specification.

My invention relates to ratchet-drills, and has for its object to provide a simple and efficient construction whereby a continuous rotation in a uniform direction may be imparted to the drill-bit by the operation of an oscillatory lever, the tool being of such construction that it may be compactly folded with the loose operating parts arranged in a suitable sheath forming part of the device.

Further objects and advantages of the invention will appear in the following description, and the novel features thereof will be pointed out in the appended claims.

In the drawings, Figure 1 is a perspective view of a drill constructed in accordance with my invention. Fig. 2 is a longitudinal central section of the same, showing the operating-rods arranged in the hollow handle. Fig. 3 is a transverse section through one of the members of the shell to show the clutch and gear mechanisms. Fig. 4 is a detail view of the core. Fig. 5 is a detail view of one of the shell-sections detached. Fig. 6 is a detail plan view, partly broken away, of the core. Fig. 7 is a detail longitudinal section of a portion of the hollow handle to show the bayonet-slot for engagement by the lateral lugs of the operating-rod.

Similar numerals of reference indicate corresponding parts in all the figures of the drawings.

The shell or casing of the improved drill comprises twin upper and lower sections 1, through which passes a tubular socket 2, upon which said sections are loosely mounted for rotation. Interposed between these shells, which are hollow, is a disk-shaped core 3, loosely mounted upon the axial socket and having peripheral rabbeted seats 4, in which the edges of the shell are fitted, and mounted for rotation in a slot 5 in the core, said slot being arranged perpendicular to a radius of the core, is a pinion 6, which projects at its opposite sides slightly beyond the planes of the upper and lower surfaces of the core. A radial oil-hole 7 (see Fig. 6) is formed in the disk, extending from the periphery thereof and fitted with a screw-plug 8, whereby oil may be supplied to the pinion.

Secured to the socket between the planes of the outer sides of the shell-sections is a friction-sleeve 10, in the construction illustrated said sleeve being separable from the socket and being held in place by means of transverse pins 11, and mounted concentric with the socket and with openings of sufficient size to receive said friction-sleeve are gears 12, provided with clutches to engage and communicate motion to the socket through the friction-sleeve. The clutches of the two gears are arranged to engage the socket when turned in opposite directions, and the teeth of the gears mesh with those of the intermediate pinion, which is carried by the core, whereby motion communicated to one of the gears is imparted in the opposite direction to the other. In the construction illustrated said clutches consist of friction balls or rollers 13, arranged in tapered seats or cavities 14, formed in the inner peripheries of the gears, small expansion-springs 15 being arranged in said seats or cavities to press the balls or rollers toward the reduced ends of the seats and thus frictionally engage the socket.

The shell-sections are provided with stirrups or keepers 16, in which are fitted the parallel portions of the arms 17, formed as extensions of the handle 18, said parallel portions of the arms being secured in the stirrups or keepers by means of the screws 19. The periphery of the core is provided with a series of seats or openings 20 for the reception of the extremity of the operating rod or lever 21, and one of the shell-sections is provided with a series of studs 22 to engage depressions 23 in the outer surface of the contiguous gear, whereby said gear is held from rotation independently of the shell-section in which it is arranged.

The shell-sections and other parts of the device are held in the proper relative positions upon the bit-socket by means of collars 34 and 35, fitted upon the bit-socket and secured in place by means of screws 36.

In operation the shell-sections are held stationary by means of the handle which is attached thereto, rotary motion alternately in opposite directions is imparted to the core by the oscillation of the operating rod or lever, and intermittent rotary motion in a uniform direction is imparted through the gearing to the bit-socket, one of said gears being held stationary by the contiguous shell-section to which is connected the handle. Under these conditions the angular velocity of the bit-socket will be double that of the lever 21. If the operating rod or lever is held stationary and the handle is oscillated, a continuous rotary motion in a uniform direction is communicated to the bit-socket.

In order to provide for feeding the bit, I employ a feed-screw 24, threaded in the upper end of the bit-socket and provided with a centering-head 25, provided with a series of diametrical sockets or seats 26, into which may be fitted the extremity of an adjusting-pin 27 for turning the feed-screw to secure the proper pressure of the bit upon the work.

For convenience in transportation the handle 18 is tubular in construction to receive the operating-lever, the latter being provided near its outer end with radial studs 28 to engage bayonet-slots 29 in the bore of the handle, and a spring 30 being arranged in the bore of the handle to exert an outward pressure upon the lever to prevent accidental disengagement of its studs from said slots, and the operating rod or lever is also tubular in construction to receive the adjusting-pin, which is provided with a threaded shoulder 31 to engage a threaded portion of the bore of said operating rod or lever. The adjusting-pin is provided with a milled head 23, and the operating rod or lever with a milled flange 33, to facilitate the detachment of the parts.

It will be understood that various changes in the form, proportion, and the minor details of construction may be resorted to without departing from the spirit or sacrificing any of the advantages of this invention.

Having described my invention, what I claim is—

1. In a ratchet drill, the combination with a bit-socket, of a sectional shell loosely mounted for rotation upon the socket, a handle attached to the shell sections, a core interposed between the shell sections and loosely mounted upon the bit-socket, gears loosely mounted upon the bit-socket, one of the gears being fixed to the contiguous shell section, a pinion carried by the core and meshing at opposite sides with said gears, clutch devices for communicating motion from the gears to the bit-socket, and means for imparting rotary motion to the core, substantially as specified.

2. In a ratchet drill, the combination with a bit-socket, of shell sections loosely mounted upon the socket, a handle attached to said shell sections, a disk-shaped core interposed between the shell sections and loosely mounted upon the bit-socket, said core having peripheral rabbeted seats for the reception of the contiguous edges of the shell sections, gears loosely mounted upon the bit-socket, connections between one of the gears and the contiguous shell section, a pinion carried by the core and meshing at opposite sides with the gears, clutches for communicating motion from the gears to the bit-socket and arranged in reversed positions, and means for imparting rotary motion to the core, substantially as specified.

3. In a ratchet drill, the combination with a bit-socket, of a shell loosely mounted thereon, a handle attached to the shell, a core loosely mounted upon the bit-socket and carrying a pinion, gears mounted concentric with the bit-socket and meshing with said pinion, one of the gears being fixed to the shell, clutches for communicating motion from either gear to the bit-socket, and means for imparting rotary motion to the core, substantially as specified.

4. In a ratchet drill, the combination with a bit-socket, of shell sections fitted loosely thereon, collars removably fitted upon the bit-socket contiguous to the outer sides of the shell sections to hold the latter in operative position, a rotary core interposed between the shell sections and loosely mounted upon the bit-socket, gears concentric with the bit-socket and arranged within the shell sections, a pinion carried by the core to communicate motion from one gear to the other, clutches carried by the gears to engage the bit-socket, and a handle bifurcated at one end and having its arms detachably secured to the shell sections, substantially as specified.

5. In a ratchet drill, the combination with a bit socket, a shell and a core mounted concentric with the bit-socket and capable of independent rotary movement, and connections between said shell, core, and bit-socket whereby rotary motion in opposite directions of the shell and core is communicated to the bit-socket to impart rotary motion in a uniform direction thereto, of a hollow handle attached to the shell, an operating rod or lever adapted to be engaged with peripheral sockets in the core, said hollow handle being provided with bayonet slots and the operating rod or lever with studs to engage said slots when the rod is arranged in the hollow handle, and a spring for imparting an outward longitudinal impulse to the operating rod or lever, substantially as specified.

6. In a ratchet drill, the combination with a bit-socket, a shell and a core mounted concentric with the bit-socket and capable of independent rotary movement, connections between said shell, core, and bit-socket whereby rotary motion in opposite directions of the shell and core is communicated to the bit-socket to impart rotary motion in a uniform direction thereto, and feeding devices having a feed screw engaging a threaded bore of the bit-socket and provided with a centering head having diametrical sockets, of a hollow handle provided near its outer end with bayonet slots, an operating rod or lever adapted to engage peripheral sockets in the core and provided with radial studs to engage said bayonet slots when the operating rod or lever is fitted in the hollow handle, a spring for imparting a longitudinal outward movement to the rod or lever and hold its studs in engagement with the bayonet slots, said operating rod or lever being tubular, and an adjusting pin adapted to engage the diametrical sockets in the centering head and provided with a threaded shoulder to engage a threaded portion of the bore of the operating rod or lever, substantially as specified.

In testimony that I claim the foregoing as my own I have hereto affixed my signature in the presence of two witnesses.

CHARLES ALEXANDER WILLIAMS.

Witnesses:
E. W. FARNHAM,
C. O. BORGERON.